United States Patent [19]

Rydbeck

[11] Patent Number: 4,949,395
[45] Date of Patent: Aug. 14, 1990

[54] METHOD AND ARRANGEMENT FOR DYNAMICALLY ALLOCATING TIME SLOTS TO CONNECTIONS IN A DIGITAL MOBILE RADIO SYSTEM

[75] Inventor: Nils R. C. Rydbeck, Lund, Sweden

[73] Assignee: Telefonaktiebolaget L M Ericsson, Stockholm, Sweden

[21] Appl. No.: 376,575

[22] Filed: Jul. 7, 1989

[51] Int. Cl.$^5$ ................................................. H04J 3/14
[52] U.S. Cl. ........................................ 455/33; 379/60; 370/95.3
[58] Field of Search .................. 455/33, 34, 54, 56, 455/57, 58; 370/95.1, 95.3; 379/59, 60, 58, 63

[56] References Cited

U.S. PATENT DOCUMENTS

| | | | |
|---|---|---|---|
| 4,638,479 | 1/1987 | Alexis | 455/33 |
| 4,722,083 | 1/1988 | Tirro et al. | 370/95.3 |
| 4,785,450 | 11/1988 | Bolgiano et al. | 370/95.1 |

*Primary Examiner*—Reinhard J. Eisenzopf
*Assistant Examiner*—Edward Urban
*Attorney, Agent, or Firm*—Burns, Doane, Swecker & Mathis

[57] ABSTRACT

The present invention relates to a cellular mobile radio system. Each cell includes a base station, a plurality of mobile stations and radio channels, for transmitted digital information between the base station and the mobile stations. More precisely the invention concern a method and an arrangement for dynamically allocating time slots to connections on the radio channels, in order to increase the capacity on the radio channels. The maximum number of simultaneous connections on the radio channels with be more than the available number of the time slots per frame. When there are more connections established on a first and a second radio channel than time slots per frame, the connections share the available time slots in accordance with a determined multiframe time slot allocation scheme known to the base station and the mobile stations. The base station is selecting one of the time slot allocation schemes in dependence on the speech activity on the two radio channels. Information on the multiframe time slot allocation scheme selected, is transmitted on the first radio channel, to the mobile stations, during guard spaces.

10 Claims, 4 Drawing Sheets

| Case no. | Connection no. 1 | 2 | 3 | 4 |
|---|---|---|---|---|
| 1 | 1 | 1 | 1 | 1 |
| 2 | 1 | 1 | 1 | 0 |
| 3 | 1 | 1 | 0 | 1 |
| 4 | 1 | 0 | 1 | 1 |
| 5 | 0 | 1 | 1 | 1 |
| 6 | 1 | 1 | 0 | 0 |
| 7 | 1 | 0 | 1 | 0 |
| 8 | 1 | 0 | 0 | 1 |
| 9 | 0 | 0 | 1 | 1 |
| 10 | 0 | 1 | 0 | 1 |
| 11 | 0 | 1 | 1 | 0 |
| 12 | 1 | 0 | 0 | 0 |
| 13 | 0 | 1 | 0 | 0 |
| 14 | 0 | 0 | 1 | 0 |
| 15 | 0 | 0 | 0 | 1 |
| 16 | 0 | 0 | 0 | 0 |

FIG. 3

| CASE NO. | FRAME NO. | CONNECTION NO. | | | | RCH1 ALLOCATION | | | RCH2 ALLOCATION | | |
|---|---|---|---|---|---|---|---|---|---|---|---|
| | | 1 | 2 | 3 | 4 | $TS_1$ | $TS_2$ | $TS_3$ | $TS_1$ | $TS_2$ | $TS_3$ |
| 1 | 1 | 1 | 1 | 1 | 1 | 1 | 2 | 3 | 1 | 2 | 4 |
| | 2 | 1 | 1 | 1 | 1 | 4 | 1 | 2 | 4 | 1 | 3 |
| | 3 | 1 | 1 | 1 | 1 | 3 | 4 | 1 | 3 | 4 | 2 |
| | 4 | 1 | 1 | 1 | 1 | 2 | 3 | 4 | 2 | 3 | 1 |
| 2 | 1 | 1 | 1 | 1 | 0 | 1 | 2 | 3 | 1 | 2 | 4 |
| | 2 | 1 | 1 | 1 | 0 | 1 | 2 | 3 | 4 | 2 | 3 |
| | 3 | 1 | 1 | 1 | 0 | 1 | 2 | 3 | 1 | 4 | 3 |
| 6 | 1 | 0 | 0 | 0 | 1 | 1 | 2 | 4 | 1 | 2 | 3 |
| | 2 | 0 | 0 | 0 | 1 | 4 | 2 | 3 | 1 | 2 | 3 |
| | 3 | 0 | 0 | 0 | 1 | 1 | 4 | 3 | 1 | 2 | 3 |
| 15 | 1 | 1 | 1 | 0 | 0 | 1 | 2 | 3 | 1 | 4 | 3 |
| | 2 | 1 | 1 | 0 | 0 | 1 | 2 | 4 | 3 | 2 | 4 |

FIG. 4

METHOD AND ARRANGEMENT FOR DYNAMICALLY ALLOCATING TIME SLOTS TO CONNECTIONS IN A DIGITAL MOBILE RADIO SYSTEM

FIELD OF INVENTION

The present invention is in the field of cellular mobile radio system operating with time multiplexing. The cells in the mobile radio system includes a base station, a plurality of mobile stations and radio channels for transmitting digital information between the base station and the mobile stations. More precisely the invention relates to a method and arrangement for dynamically allocating time slots in frames to connections, in order to increase the capacity of the system.

BACKGROUND OF THE INVENTION

An established connection between a base station and a mobile station in a digital mobile system of today usually utilizes one time slot per frame for transmitting speech information from the base station to the mobile station on a first radio channel, and one time slot per frame for transmitting speech information in the opposite direction on a second radio channel. A specific time slot on the first and the second radio channel is therefore allocated to the mobile station. Thus, the maximum number of simultaneous connections in this known system is the same as the number of time slots per frame on the radio channels.

It is already known to increase the capacity on the radio channels so that the number of possible simultaneous connections can exceed the number of time slots. The idea is based on reusing time slots when the users are not speaking. The method has been used for trans ocean cables under names like TASI before. In these cases the technique has been used for achieving double capacity. Unfortunately, this goal, together with the way it was implemented has not given the TASI-systems good reputation because they did not work in a good way.

It is known that frames on radio channels, apart from time slots, also contains guard spaces. For example there can be a guard space between each time slot. The guard spaces are used for avoiding the information transmitted from the mobile stations, completely or partially, overlapping each other in the receiver of the base station.

SUMMARY OF THE INVENTION

The object of the present invention is to achieve a digital mobile radio system in which the capacity may be increased, so that the maximum number of simultaneous connections on a radio channel become more than the available number of time slots per frame, without the degradation in the speech quality being troublesome.

This is accomplished by a method of dynamically allocating time slots in frames to connections in the digital mobile radio system comprising a base station, mobile stations and a first and a second radio channel. In brief the method comprises the steps of:

determining a plurality of multiframe time slot allocation schemes, for allocating time slots when the first and the second radio channels are used for more connections than time slots in a frame;

if there are more established connections than available number of time slots on each channel then detecting the speech activity on each of the established connections from the base station to the mobile stations, selecting one of the time slot allocation schemes in dependence of the detected speech activity, transmitting from the base station on the first radio channel, during guard spaces, information on the multiframe time slot allocation scheme selected and, during time slots, speech information in accordance with the time slot allocation scheme selected, receiving the speech information in the mobile stations in accordance with the time slot allocation scheme selected, and transmitting from the served mobile stations on the second radio channel speech information in accordance with the multiframe time slot allocation scheme determined by the information in the guard spaces of the first radio channel.

For using the method the base station, among other things, comprises an apparatus for storing the multiframe time slot allocation schemes, a plurality of detection apparatus for detecting the speech activity towards the mobile stations and a switching apparatus for switching information to time slots in accordance with a selected time slot scheme. The mobile stations, among other things, comprises an apparatus for storing the multiframe time slot allocation schemes, an apparatus for reading the information on the time slot allocation scheme selected, transmitted during the guard spaces, on the first radio channel and means for transmitting, on the second radio channel, speech information in accordance with a time slot scheme selected in the base station.

By using this method on a system with three time slots per radio channel the number of simultaneous connections may be increased from three to four, almost without adding any hardware to the base station or the mobile stations. The speech degradation is so small that it will normally not be noticed by the users. Since this feature is software controlled and implemented it is intended as a tool available to the operator when he finds that the system load has achieved unacceptable levels, and no other means for increasing capacity can be implemented.

THE DRAWINGS

FIG. 3 Illustrates the different cases for the speech activity on four telephone lines.

FIG. 4 Illustrates some examples of multiframe time slot allocation schemes.

BEST MODE FOR CARRYING OUT THE INVENTION

Figure 1:
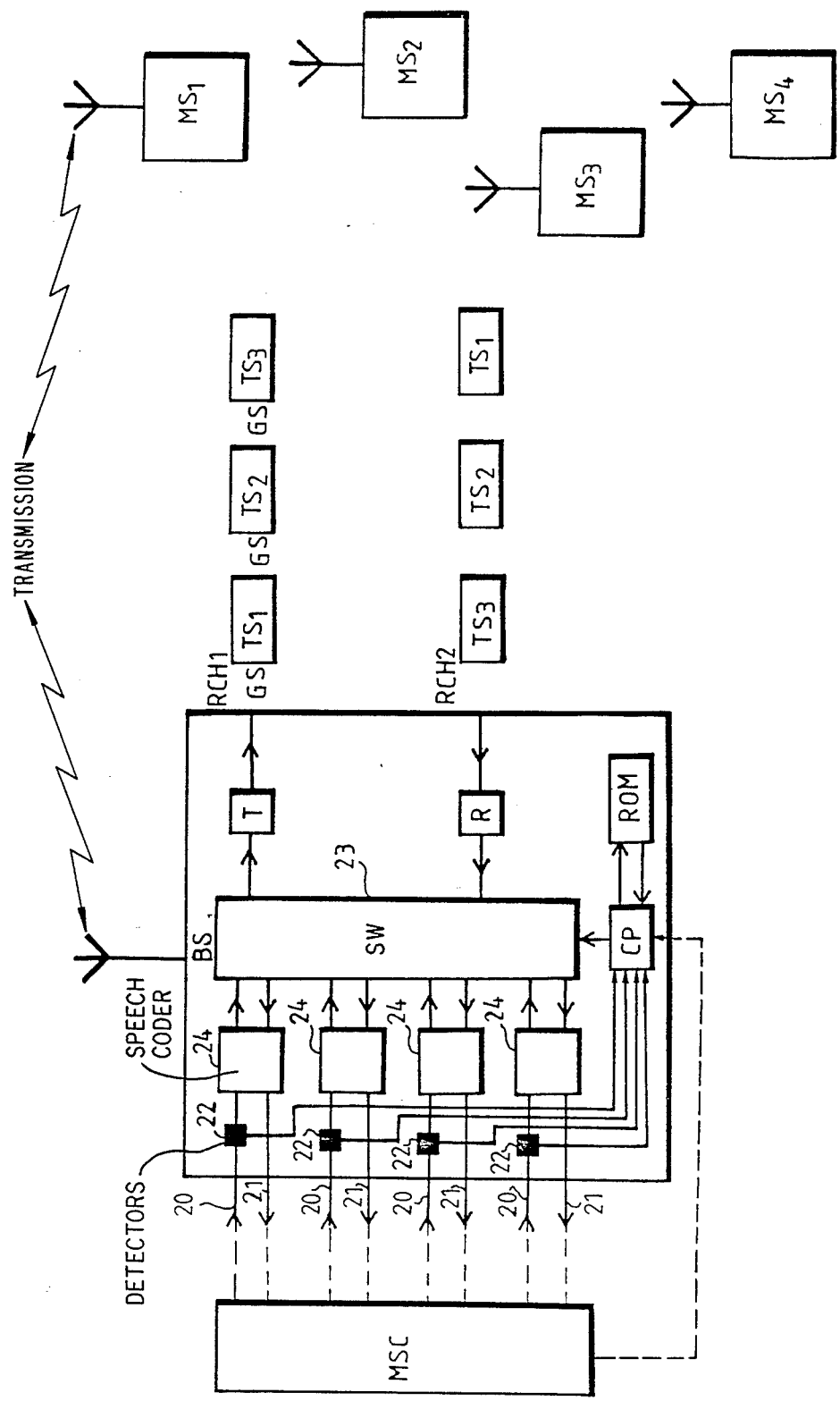
FIG. 1 Illustrates a mobile radio system according to the invention.

FIG. 1 illustrates a base station BS, four mobile stations $MS_1$, $MS_2$, $MS_3$, $MS_4$ and two radio channels RCH1, RCH2 in a cell in a cellular mobile radio system. The cellular mobile radio system comprises of many additional cells, not shown in the figure. Also illustrated in FIG. 1 is a mobile switching centre MSC connected to the base station BS by cables. The base station is responsible for the radio communication between the mobile stations and the base station. There is a first radio channel RCH1 for radio communication from the base station BS to the mobile stations $MS_1, \ldots MS_4$ and a second radio channel RCH2 for radio communication from the mobile stations to the base station. The radio channels are used for digital communication and they are divided into time slots and the time slots are grouped in frames.

The time slots are alloted to connections whereby multiple connections share a common radio channel in time division multiplex. The radio channels RCH1,RCH2 have three time slots in each frame, the time slots are denoted $TS_1,TS_2,TS_3$. Connections between the base station BS and the mobile station $MS_1, \ldots MS_4$ are established when the mobile stations are connected to any subscriber, mobile or permanent.

In known technique one time slot on each radio channel is usually used for one established connection between the base station and a mobile station. Thus, by using this known technique it is only possible to establish three simultaneous connections on the radio channels RCH1,RCH2.

By a method of dynamically allocating time slots to connections the maximum number of simultaneous connections on the radio channels RCH1,RCH2 will be increased, so that four simultaneous connections may be established instead of three, the three time slots $TS_1,TS_2,TS_3$ being used for the four mobile stations $MS_1, \ldots, MS_4$. When four connections are established for the four mobile stations $MS_1, \ldots, MS_4$ they share the three time slots in accordance with a determined multiframe time slot allocation scheme known to the base station and the mobile stations. The allocation of time slots is dependent on the speech activity on the connections. The method utilizes the fact that there is usually not active speech all the time on all four connections, due to speech pauses, silence periods and similar things encountered in normal speech. This time slot allocation schemes are only used when there are four simultaneous connections established, for communication towards and from the mobile stations $MS_1, \ldots MS_4$. When there are three or less connections the slots are allocated permanently, one time slot for each mobile station.

A plurality of multiframe time slot allocation schemes will be determined for the first and the second radio channels. The basis of the schemes is the speech activity in the direction from the base station BS to the mobile stations for determining the allocation scheme for the first radio channel RCH1. This speech activity is monitered from the base station. In FIG. 3 a speech activity scheme is illustrated. There are sixteen different cases of speech activity towards the mobile stations. A one (1) denotes that the user is speaking, a zero (0) denotes that he is not. In the first case there is speech activity on all of the four connections. In the second case there is speech activity on three of the four connections, there is speech activity towards the first, second and third mobile station $MS_1,MS_2,MS_3$ but no speech activity towards the fourth mobile station $MS_4$. The other fourteen cases are illustrated in the same way in the scheme in FIG. 3.

For each of the sixteen cases of speech activity in direction towards the mobile stations, an assumption is made of the speech activity in the opposite direction, from the mobile stations for determining the allocation scheme for the second radio channel RCH2. For example, in case no. two, the user of mobile station no. four $MS_4$ is probably speaking, in direction towards the base station.

Thus, for each of these sixteen cases there will be a multiple frame time slot allocation scheme determined for both the first and the second radio channel. FIG. 4 illustrates four different multiframe time slot allocation schemes (hereinafter referred to as allocation schemes) corresponding to the speech activity cases no. 1,2,15,6. The allocation schemes are given a number, the same as the number of the corresponding case.

In speech activity case number one there is speech detected on all four connections in direction towards the mobile stations $MS_1,MS_2,MS_3,MS_4$. In this case the four connections are allotted a time slot in turn-on the first radio channel RCH1, so that the three time slots $TS_1,TS_2,TS_3$ being equally allocated to the four connections. In the allocation scheme no. one for the first radio channel RCH1 this is illustrated. During frame no. one time slot number one $TS_1$ is allocated to the first connection 1, time slot number two $TS_2$ is allocated to the second connection 2 and time slot number three $TS_3$ is allocated to the third connection 3. During frame no. two, time slot no. one is allocated to the fourth connection 4, time slot no. two $TS_2$ is allocated to the first connection 1 and time slot number three $TS_3$ is allocated to the second connection and so on. The numerals in this scheme denotes the number of the actual connection. The allocation scheme in the first case is repeated after four frames. An allocation scheme no. one, for the second radio channel RCH2 is also illustrated in the figure. Also in this scheme the time slots are equally allocated to the four connections during the four frames.

In speech activity case no. two there is speech activity only on three connections in the direction from the base station to the mobile stations. The number denoting a connection is identical with the number of the corresponding mobile station. There is speech detected towards mobile station no. one $MS_1$, no. two $MS_2$ and no. three $MS_3$. There is no speech activity towards mobile station no. four $MS_4$. In allocation scheme no. two for the first channel RCH1 the three time slots $TS_1,TS_2,TS_3$ are allocated to the first, second and third connections 1,2,3, whereas the fourth connection not being allotted any time slot because there is no speech toward mobile station no. four $MS_4$. For determining the allocation scheme no. two for the second radio channel there is an assumption that there is speech activity in the direction from the fourth mobile station $MS_4$, this connection being alloted a time slot in each frame on the second radio channel. The other three connections share the remaining two time slots equally during three frames. The allocation scheme for the second case is repeated after three frames.

Speech activity case no. fifteen has no speech activity on the first, second and third connections, but there is speech activity on the fourth connection. Thus, the speech activity in this case is the opposite to the speech activity in case no. two. Therefore the allocation scheme no. fifteen for the first radio channel is identical with the allocation scheme no. two for the second channel and the allocation scheme no. fifteen for the second radio channel RCH2 is identical with the allocation scheme no. two for the first channel.

Speech activity case no. six illustrates an example when two users are speaking in the direction towards the mobile stations. Speech activity is detected on the first and the second connections. Thus, the first and the second time slots $TS_1,TS_2$ being allocated to these connections on the first radio channel. The third time slot TS$_3$ being allocated to the third connection during the first frame and to the fourth connection during the second frame. The scheme no. six is repeated after two frames. In the opposite direction, on the second radio channel the third and fourth connection are allocated time slots during both frames, because the user of the mobile stations no. three and four MS$_3$,MS$_4$ is probably speaking. The user of the mobile stations no. one and two MS$_1$,MS$_2$ is probably not speaking, and therefore the remaining time slot being shared between the first and the second connections on the second radio channel RCH2.

In the same manner allocation schemes are determined for the remaining cases of speech activity. Thus, the principles of determining the allocation schemes is that, as far as possible allocate time slots to connections where speech is going on and assume that if there is speech going on in one direction, there is no speech going on in the opposite direction. By allocating time slots in accordance with this principles, illustrated in the examplified allocation schemes, the user of the connections will hardly not notice the reduction in the quality of the transmitted speech. It is possible to determine different allocation schemes on the same principles and still utilize the available time slots efficiently.

As mentioned, the quality of the transmitted speech will go down by a small amount when the method is used. The worst case that can happen is when speech is detected on all four connections in the same direction. In this case each user will get ¾ of the time slot allocation he would normally get. However, in this worst case an error correcting coding together with the allocation scheme design will provide a transmitted speech with reasonable quality by considering that this worst case would normally occur less than a second. It should here be noted that even if all four users have speech in the same direction for several seconds, all four connections will not have active speech all the time, any way, due to speech pauses, silence periods and similar things encountered in normal speech. It is this speech pauses and silence periods that are denoted zero (0) in the speech activity scheme in FIG. 3.

The speech activity in the direction towards the mobile stations MS$_1$, . . . MS$_4$ is continously monitored when there are four connections established on the radio channels and during every frame there is a specific speech activity case detected, the time slots TS$_1$,TS$_2$,TS$_3$ being dynamically allocated to the four connections in accordance with the allocation scheme corresponding to the detected case.

Figure 2:
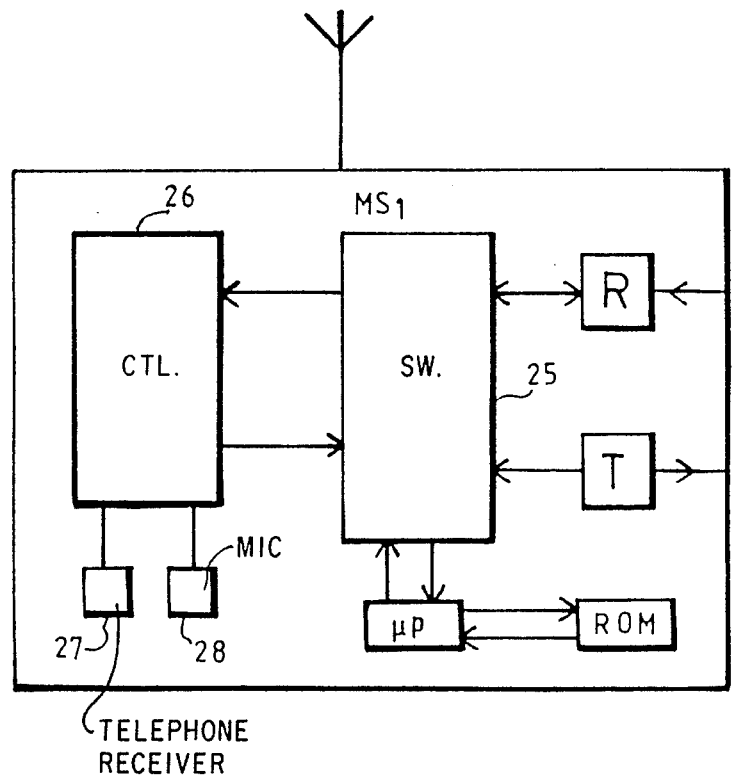
FIG. 2 Illustrates a mobile station.

The following description refer to FIGS. 1 and 2. After determining the allocation schemes for the first and the second channels RCH1,RCH2, the schemes are stored in a memory, in the base station BS and in the mobile stations MS$_1$, . . . MS$_4$. For example the memory can be a read only memory ROM. There are sixteen different allocation schemes and each is identified by a unique four bit code.

It is not necessary to store all sixteen allocation schemes in the memory. Due to symmetry the number of schemes to be stored are reduced to eight. For example allocation scheme no. two for the first radio channel RCH1 is identical with the allocation scheme no fifteen for the second radio channel RCH2 and vice versa, because the corresponding speech cases are the inversion of each other.

Each connection has an incoming telephone line 20 to the base station, and an outgoing telephone line 21 from the base station BS. These telephone lines 20,21 connects the base station BS to the mobile switching center MSC, so that the mobile stations MS$_1$, . . . MS$_4$ may establish connections to other subscribers. From the base station BS the number of established connections using the first and the second radio channels is monitored by a central processor CP. The central processor CP receives information from the mobile switching center MSC about how many connections are established. If there are four established connections on the radio channels RCH1,RCH2 then the central processor CP is monitoring the amount of information to be transmitted on these i.e. the speech activity, towards the mobile stations MS$_1$, . . . MS$_4$. The speech activity is detected by detection apparatus 22, one connected to each of the incoming telephone lines 26. The detection apparatus 22 are connected to the central processor CP, which for each frame selects one of the time slot allocation schemes in dependence of the detected speech activity case. The read only memory ROM where the allocation schemes are stored is connected to the central processor CP.

The base station comprises switching equipmentts 23 for switching speech information, incoming to the base station BS, on the incoming telephone lines 20 to the time slots TS$_1$,TS$_2$,TS$_3$ on the first radio channel RCH1. The switching equipment 23 is controlled by the central processor CP, the time slots TS$_1$,TS$_2$,TS$_3$ being allocated to the four connections on the first radio channel RCH1 in accordance with an allocation scheme selected by the central processor CP. Before the speech information reaches the switching equipment 23 it passes a speech coder 24, for digitalizing the speech information.

For each frame, information about the actual multi frame time slot allocation scheme selected being transmitted from the base station on the first radio channel during guard spaces GS. Guard spaces on the first radio channel are not utilized for any other purpose but on the second radio channel the guard spaces are utilized for avoiding the speech information transmitted from the mobile stations overlapping each other in the base station. There are sixteen different allocation schemes and a bit code for identifying each of them comprises four digital bits. This four bit code tells the receiving mobile stations about the actual allocation scheme for both the first and the second radio channel. The guard spaces in each frame transmitted on the first radio channel also comprises a two bit code which constitutes information about the number of the frame in the actual allocation scheme. Then the mobile station knows, for a received frame, which frame in the allocation scheme, for the moment selected, it corresponds to. The guard spaces in the first channel also comprises one bit, which tells the receiving mobile stations whether the time slots are allocated to connections in accordance with an allocation scheme or not, i.e. whether there are four connections on the radio channels or less.

In known mobile radio systems the transmitted information, both speech information and control information, is protected by error correcting coding. Also this four bit code information about the actual multiframe time slot allocation scheme selected is protected by error correcting coding. For this purpose the guard spaces on the first radio channel also comprises a plurality of bits for error correcting coding.

A transmitter T in the base station BS transmitts the information in the guard spaces GS and in the time slots TS₁,TS₂,TS₃ on the first radio channel RCH1. During the time slots TS₁,TS₂,TS₃ speech information is transmitted in accordance with a time slot allocation scheme selected if there are four connections established. If there are three or less connections established each of the established connections allots one time slot permanently.

In FIG. 2 is illustrated a simplified scheme of one of the identical mobile stations. In the mobile stations MS₁, ..., MS₄, information on the allocation scheme selected is received in a receiver R. The mobile stations comprises a micro processor µP for controlling the events in the mobile station.

When a transmitted frame is received in the mobile stations MS₁, ..., MS₄ the micro processor µP in each mobile station reads the information in the guard spaces GS. If the information tells that there are four connections on the radio channels the micro processor µP compare the four bit code in the guard spaces GS with the four bit codes in the read only memory ROM in the mobile station for identifying the time slot allocation scheme selected for this frame. When the allocation scheme selected is identified, the micro processor µP in each of the mobile stations controls its own station in accordance with the identified allocation scheme. All speech information in a received frame being stored in a switching apparatus 25 controlled by the micro processor µP, then the speech information intended for the user of one station, transmitted on a connection corresponding to this mobile station, being converted to audible sound.

A transmitter T in each of the mobile stations transmits speech information from the user of the mobile stations MS₁, ... MS₄, on the second radio channel. The speech information is transmitted in accordance with the multiframe time slot allocation scheme determined by identification of the four bit code in the guard spaces GS of the first radio channel RCH1. In the switching apparatus 25, the connections corresponding to the mobile stations are allotted time slots in accordance with the allocation scheme identified. The mobile station, among other things, also includes a control unit 26, a telephone receiver 27 and a microphone 28.

A receiver R in the base station BS receives the speech information transmitted from the mobile stations MS₁, ... MS₄ on the second radio channel RCH2. The central processor CP controls the switching equipment 23, so that the speech information received is switched to the four outgoing telephone lines 21 in accordance with the allocation scheme selected.

The central processor, as earlier mentioned, continously monitors the speech activity when there are four connections established. Most likely, the detected speech activity is changed often. As there are changes in speech activity the connections are dynamically allocated to time slots by the central processor selecting different allocation scheme depending on the actual case of speech activity.

By this method it is also possible to increase the capacity on radio channels comprising for example four or six time slots per frame. The capacity may be increased from four to five connections or from six to eight connections. Allocation schemes must be determined for the actual radio channels. To be sure to avoid the problems encountered in the past it is suitable to increase the capacity about 25%, thus the transmitted speech quality will be reasonable.

I claim:

1. A method of dynamically allocating time slots in frames on radio channels to connections in a cellular mobile radio system comprising base stations, mobile stations and radio channels, the method comprising the steps of:
   dividing a first and a second radio channel into time slots grouped in frames of equal length;
   determining a plurality of multiframe time slot allocation schemes for the first and second radio channels;
   monitoring the number of established connections at a serving base station and comparing with the available number of time slots;
   monitoring the amount of information to be transmitted on established connections from the serving base station;
   selecting one of the time slot allocation schemes for the first and second radio channels in dependence upon the monitored number of established connections in relation to the available number of time slots and the monitored amount of information;
   transmitting from the serving base station in guard spaces of the first channel information on the multiframe time slot allocation scheme selected for the first and second radio channels;
   transmitting from the serving base station information on more connections than the time slots in a frame to served mobile stations on the first radio channel, the time slots being allotted to the connections in accordance with the multiframe allocation scheme selected;
   receiving in served mobile stations radio signals transmitted by the serving base station in the guard space of the first radio channel; and
   transmitting from the served mobile stations radio signals on the second radio channel, whereby the speech information is transmitted from the mobile stations in accordance with the multiframe time slot allocation scheme determined by the information in the guard spaces of the first radio channel.

2. A method of dynamically allocating time slots in frames on radio channels to connections in a cellular mobile radio system comprising a base station, mobile stations, a first radio channel for transmitting speech information from the base station to the mobile stations and a second radio channel for transmitting speech information from the mobile stations to the base station, the radio channels being divided into frames of equal length and the frames being divided into time slots, the method comprising the steps of:
   determining a plurality of multiframe time slot allocation schemes, for allocating time slots when the first and second radio channels are used for more connections than time slots in a frame, the time slot allocation schemes including time slot allocation for the first and the second radio channels;
   monitoring the number of established connections using the first and second radio channels at the base station and
   if there are more established connections than available number of time slots on each channel then
   monitoring the amount of information to be transmitted on each of the established connections from the serving base station,
   selecting one of the time slot allocation schemes in dependence of the amount of information to be transmitted on established connections from the base station to the served mobile stations;

transmitting from the base station, on the first radio channel, during guard spaces, information on the multi frame time slot allocation scheme selected for the first and second radio channels, transmitting from the base station, on the first radio channel, during the time slots, speech information in accordance with the time slot allocation scheme selected;

receiving in served mobile stations on the first radio channel, information on the time slot allocation scheme selected, the speech information being received in accordance with the time slot allocation scheme selected, transmitting from the served mobile stations, on the second radio channel speech information in accordance with the multiframe time slot allocation scheme determined by the information in the guard spaces of the first radio channel, receiving in the base station, on the second radio channel, speech information in accordance with the multiframe time slot allocation scheme selected, also, if there not are more established connections than available number of time slots, each of the individual mobile stations served is allotted one time slot permanently on the radio channels.

3. Method according to claim 1 in which method the information on the multiframe time slot allocation scheme selected, transmitted on the first radio channel during guard spaces, is protected by error correcting coding.

4. Method according to claim 1, in which method the radio channels comprise three time slots per frame, the three time slots being dynamically allocated to four established connections in accordance with a selected multiframe time slot allocation scheme whereby the capacity is increased from three to four connections on the first and the second channels.

5. Method according to claim 1 wherein a multiframe time slot allocation scheme is determined for each possible speech activity case, which can be detected when monitoring the amount of information to be transmitted on each of the established connections from the serving base station.

6. An arrangement for dynamically allocating time slots in frames on radio channels to connections in a digital mobile radio system, the arrangement comprising:

a base station;

a plurality of mobile stations;

a first radio channel, for transmitting information from the base station to mobile stations served by the base station and a second radio channel for transmitting information from the served mobile stations to the base station, the radio channels being divided into time slots grouped in frames;

an apparatus for storing a plurality of multiframe time slot allocation schemes;

a plurality of detection apparatus for detecting the speech activity on established connections;

a switching apparatus for switching speech information, incoming to the base station, to time slots on the first radio channel;

means for transmitting information from the base station to the served mobile stations on the first radio channel;

when there are more established connections on a radio channel than available number of time slots per frame, the detection apparatus detects the speech activity on the established connections and a central processor in the base station selects one of the time slot allocation schemes in dependence on the speech activity detected, whereby during guard spaces, information on the multiframe time slot allocation scheme selected, is transmitted from the base station to the mobile stations served and during the time slots, speech information in accordance with the time slot allocation is transmitted;

an apparatus in each of the mobile stations for storing the multiframe time slot allocation schemes;

an apparatus in each of the mobile stations for reading the information on the time slot scheme selected, transmitted from the base station during the guard spaces;

an apparatus in each of the mobile stations for identifying the time slot allocation scheme selected, transmitted from the base station during the guard spaces;

means for transmitting, from the served mobile stations to the base station, speech information in accordance with the multiframe time slot allocation scheme identified.

7. An arrangement according to claim 6 wherein said apparatus for storing the multiframe time slot allocation schemes consists of read only memories (ROM).

8. Method according to claim 2 in which method the information on the multiframe time slot allocation scheme selected, transmitted on the first radio channel during guard spaces, is protected by error correcting coding.

9. Method according to claim 2, in which method the radio channels comprises three time slots per frame, the three time slots being dynamically allocated to four established connections in accordance with a selected multiframe time slot allocation scheme whereby the capacity is increased from three to four connections on the first and the second channels.

10. Method according to claim 2 wherein a multiframe time slot allocation scheme is determined for each possible speech activity case, which can be detected when monitoring the amount of information to be transmitted on each of the established connections from the serving base station.

* * * * *